United States Patent
Hsu

(10) Patent No.: US 7,849,598 B2
(45) Date of Patent: Dec. 14, 2010

(54) METHOD FOR MANUFACTURING AN ISOTHERMAL PLATE

(75) Inventor: Hul-Chun Hsu, Taichung (TW)

(73) Assignee: Jaffe Limited (VG)

( * ) Notice: Subject to any disclaimer, the term of this patent is extended or adjusted under 35 U.S.C. 154(b) by 1154 days.

(21) Appl. No.: 11/465,200

(22) Filed: Aug. 17, 2006

(65) Prior Publication Data
US 2008/0047140 A1    Feb. 28, 2008

(51) Int. Cl.
*B23P 6/00*  (2006.01)
*B23P 11/00* (2006.01)
*B21D 53/08* (2006.01)

(52) U.S. Cl. ............ 29/890.032; 29/890.038; 29/890.04; 29/890.041; 29/890.043; 29/890.045; 29/458; 29/466; 29/505; 29/506; 29/513

(58) Field of Classification Search ......... 29/890.032, 29/890.038, 890.039, 890.04, 890.041, 890.043, 29/890.045, 458, 466, 505, 506, 513; 165/104.21, 165/104.26, 168–171; 228/183, 248.1, 248.5
See application file for complete search history.

(56) References Cited

U.S. PATENT DOCUMENTS

| | | | | | |
|---|---|---|---|---|---|
| 1,982,075 | A | * | 11/1934 | Smith | ............... 29/890.035 |
| 4,074,406 | A | * | 2/1978 | Boyd et al. | ............ 29/890.033 |
| 4,248,210 | A | * | 2/1981 | Ortega | ............... 126/666 |
| 4,279,066 | A | * | 7/1981 | Riley | ............... 29/890.033 |
| 4,347,965 | A | * | 9/1982 | Grossman et al. | ......... 228/107 |
| 7,131,200 | B2 | * | 11/2006 | Lin et al. | ............... 29/890.038 |
| 2004/0170000 | A1 | * | 9/2004 | Fujiwara et al. | ........... 361/719 |

FOREIGN PATENT DOCUMENTS

| | | | |
|---|---|---|---|
| EP | 32965 | A1 * | 8/1981 |
| EP | 41653 | A1 * | 12/1981 |
| EP | 157370 | A2 * | 10/1985 |
| JP | 59125228 | A * | 7/1984 |
| TW | 510961 | | 11/2002 |

* cited by examiner

*Primary Examiner*—David P Bryant
*Assistant Examiner*—Sarang Afzali
(74) *Attorney, Agent, or Firm*—Chun-Ming Shih; HDLS IPR Services

(57) ABSTRACT

A method for manufacturing an isothermal plate includes the steps of preparing a plurality of heat pipes, a first plate body and a second plate body; pressing on the second plate body to form a plurality of shielding covers recessed into the bottom surface of the second plate body and protruding from the top surface of the second plate body, the recessed portion of each shielding cover having a cambered space for horizontally accommodating the heat pipe therein; disposing each heat pipe into each cambered space to make the first plate body adhered to the bottom surface of the second plate body and the two plate bodies overlapped with each other; and applying an external force to the second plate body to bring each heat pipe into a tight and planar contact with the inner wall of its corresponding cambered space in the direction of pressing.

7 Claims, 4 Drawing Sheets

METHOD FOR MANUFACTURING AN ISOTHERMAL PLATE

BACKGROUND OF THE INVENTION

1. Field of the Invention

The present invention relates to a method for manufacturing an isothermal plate, and in particular to an isothermal plate in which two plate bodies are used to sandwich a plurality of heat pipes, and the two plate bodies and each heat pipe are further tightly connected by means of pressing.

2. Description of Prior Art

Taiwan Patent Publication No. 510961 entitled "Method for manufacturing heat-dissipating plate and heat pipe" discloses a procedure comprising the steps of: processing a heat-dissipating plate, providing a plurality of heat-conducting passages with their distal ends un-penetrated, sealing the open end of each heat-conducting passage and keeping at least one opening, filling the open end with a working fluid and performing a vacuum treatment to the kept open end, and sealing the kept open end. The object of said patent document is to utilize the heat-dissipating plate made of materials having better heat conductivity (such as copper and aluminum), and cooperate with the processing method to form heat-conducting passages. A capillary structure and the working fluid are filled into the heat-conducting passages. In this way, the heat-dissipating plate is formed into a heat pipe, and in operation, the heat can be rapidly conducted to the outside by the principle of heat pipe.

When the working fluid is heated to vaporize, the thus-generated vapor moves toward the lower-pressure condensed end to form a vapor flow. After cooling down at the condensed end, the vapor releases its latent heat, which is called the principle of heat pipe. With the circulation of this principle, the heat of the heat source can be dissipated. No matter whether the heat-dissipating plate and heat pipe finally formed in Taiwan Patent Publication No. 510961 have efficiently achieved heat dissipation, the processing procedure indeed has some difficulty in practice. First, the heat-dissipating plate is subjected to the processing procedure for forming the heat-conducting passages. Precision is required when forming the heat-conducting passages. When the angle of initial processing is slightly deviated, the whole passage will oblique, resulting in the bad products (such as the collapse of the surface of the heat dissipating plate). Further, since there are a lot of heat-conducting passages, the possibility of error may be relatively increased, resulting in the poor practicability of mass production.

In view of the above, the inventor proposes the present invention to overcome the above problems based on his expert experiences and deliberate researches.

SUMMARY OF THE INVENTION

The present invention is to provide a method for manufacturing an isothermal plate, wherein two plate bodies are used to sandwich a plurality of heat pipes so as to form the isothermal plate. Further, when the two plate bodies and each heat pipe are connected together, with the pressing operation, the connection between the two plate bodies and each heat pipe can be made much tighter. The method for manufacturing an isothermal plate of the present invention is a manufacturing technique that does not require high precision and will not generate machining chips. Further, the yield of products is also increased.

The present invention provides a method for manufacturing an isothermal plate, which comprises the steps of:

a) preparing a plurality of heat pipes, a first plate body and a second plate body;
b) pressing on the second plate body to form a plurality of shielding covers recessed into the bottom surface of the second plate body and protruding from the top surface of the second plate body, the recessed portion of each shielding cover having a cambered space for horizontally accommodating the heat pipe therein;
c) disposing each heat pipe into each cambered space to make the first plate body adhered to the bottom surface of the second plate body and the two plate bodies overlapped with each other; and
d) applying an external force to the second plate body to bring each heat pipe into a tight and planar contact with the inner wall of its corresponding cambered space in the direction of pressing.

DETAILED DESCRIPTION OF THE INVENTION

In order to make the Examiner better understand the characteristics and the technical contents of the present invention, a detailed description relating to this will be made with reference to the accompanying drawings. However, it should be understood that the drawings are illustrative but not used to limit the scope of the present invention.

Figure 1:
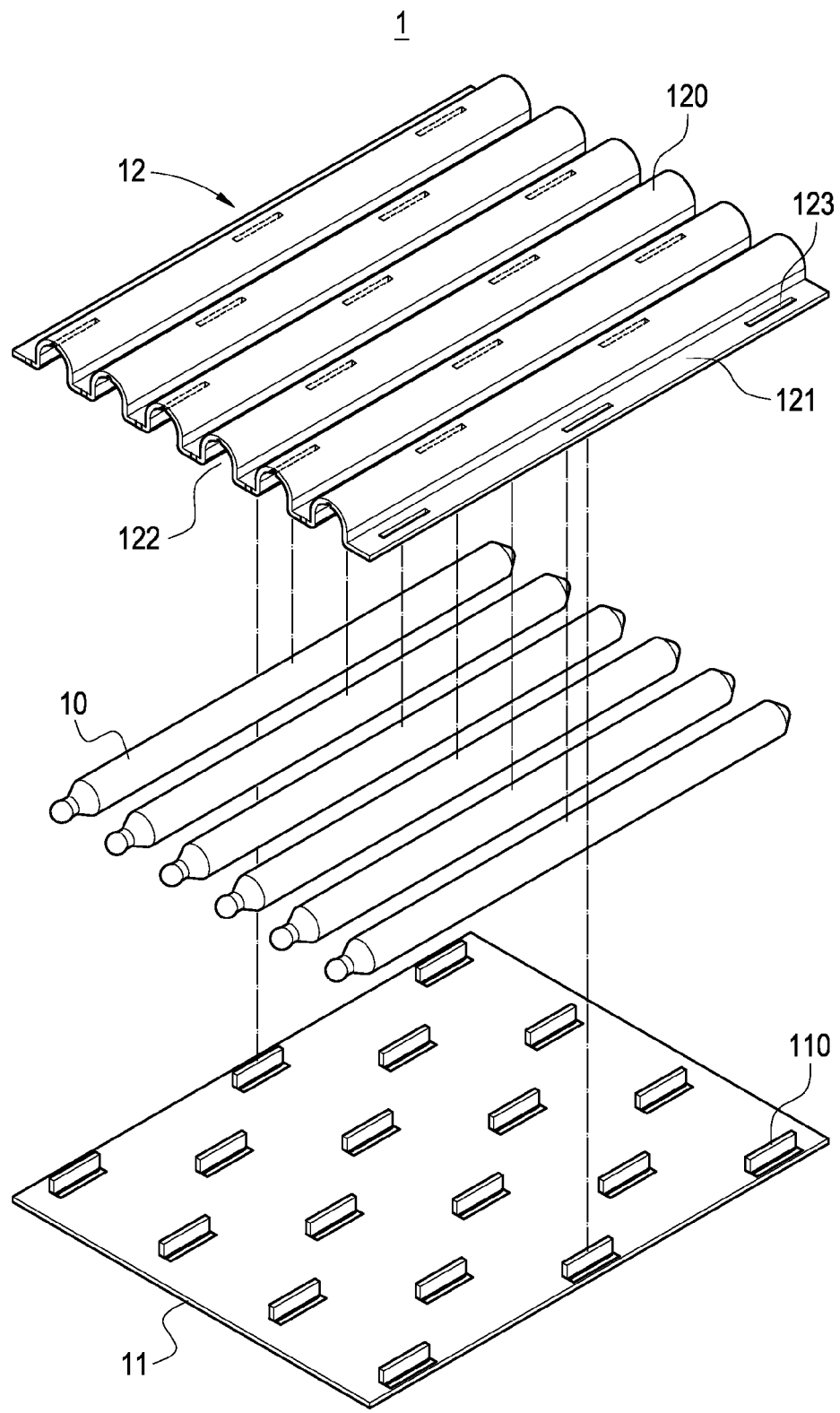
FIG. 1 is an exploded view of the isothermal plate of the present invention.

With reference to FIG. 1, it is an exploded view showing the isothermal plate of the present invention. The present invention provides a method for manufacturing an isothermal plate, which comprises the steps as follows.

First, a plurality of heat pipes 10, a first plate body 11 and a second plate body 12 necessary for constituting the isothermal plate 1 are prepared. Both the first plate body 11 and the second plate body 12 are made of materials having good heat conductivity such as aluminum, copper or the like and each formed into a flat plate. Further, on the second plate body 12, a plurality of linear and elongated shielding covers 120 is formed by means of pressing. These shielding covers are recessed into the bottom surface of the second plate body 12 and protrude from the top surface of the second plate body. Each shielding plate 120 extends from one side of the second plate body 12 to another side thereof. Each shielding cover 120 is arranged at an interval and parallel to each other, so that a connecting side-strip 121 is formed between any two adjacent shielding covers 120. Further, the recessed portion of each shielding cover 120 is a cambered space 122 for horizontally accommodating the heat pipe 10 therein. The number of each cambered space 122 is identical to that of the heat pipes 10.

According to the above, each heat pipe 10 is disposed into each cambered space 122 with the first plate body 11 adhered to the bottom surface of the second plate 12, so that the two plate bodies 11, 12 overlap with each other. In the embodiment of the present invention, broken holes 123 are made on each connecting side-strip 121 of the second plate body 12.

The first plate is provided with locking pieces bent upwardly at the positions corresponding to the broken holes 123. With this arrangement, when the first plate body 11 and the second plate body 12 overlap with each other, each locking piece 110 penetrates through the corresponding broken hole 123 to provide a preliminary connection between the first plate body 11 and the second plate body 12, thereby to smooth the sequential process.

Figure 2:
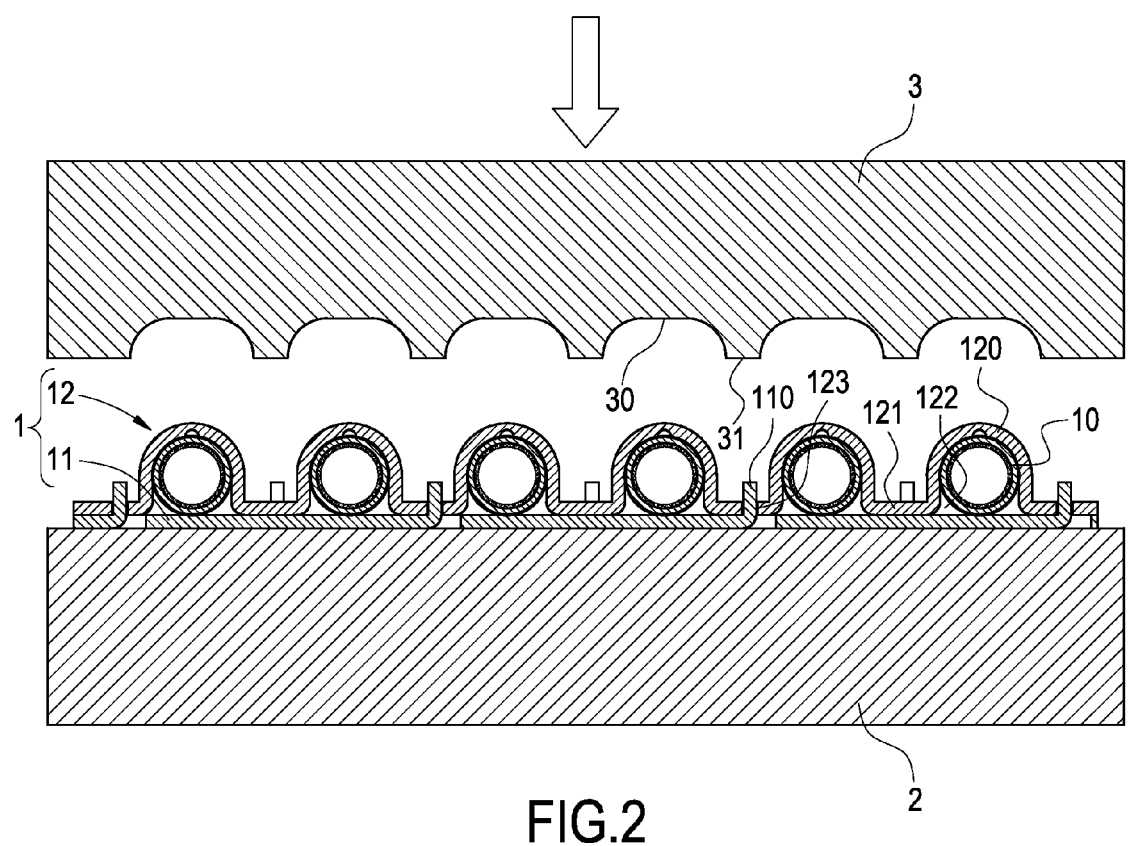
FIG. 2 is a schematic view showing the action of pressing the isothermal plate of the present invention.
Figure 3:
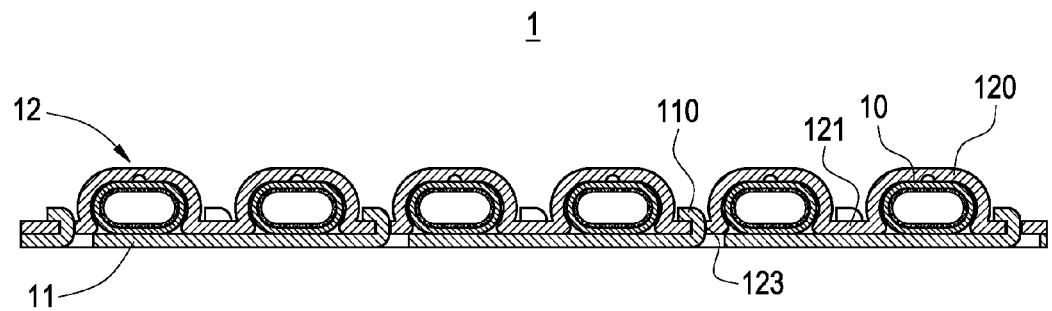
FIG. 3 is a cross-sectional view showing the isothermal plate of the present invention after pressing.
Figure 4:
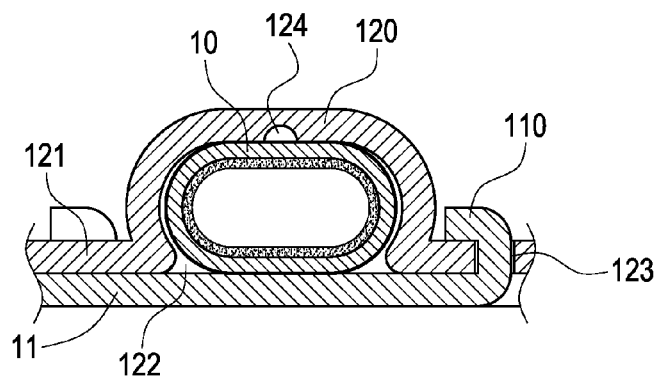
FIG. 4 is a partially enlarged view showing the details of FIG. 3.

With reference to FIG. 2, after the heat pipes 10 overlap with the first and second plate bodies 11, 12, the isothermal plate 1 can be disposed on a pressing platen 2. A press-forming mold 3 is provided above the press-forming platen 2, so that the press-forming platen 3 can perform the pressing operation to the first and second plate bodies 11, 12 and each heat pipe 10 along a vertical direction. The pressing surface of the press-forming mold 3 is recessed to provide with a plurality of flat grooves 30. Each flat groove 30 corresponds to each shielding cover 120 of the second plate body 12. A pressing surface 31 protrudes downwardly from the portion between any two adjacent flat grooves 30 to correspond to each locking piece 110 on the first plate body 11. In pressing, since each flat groove 30 first applies an external force to the second plate body 12, each shielding cover 120 and heat pipe 10 generate a plastic deformation and thus is flattened by the flat groove 30, as shown in FIG. 4. Therefore, each heat pipe 10 can be brought into a tight and planar contact with the inner wall of the corresponding shielding cover 120 in the direction of pressing (i.e., at the flattened portions after pressing), thereby to combine the first and second plate bodies 11, 12 with each heat pipe 10. As a result, the isothermal plate 3 of the present invention can be obtained, as shown in FIG. 3.

Figure 5:
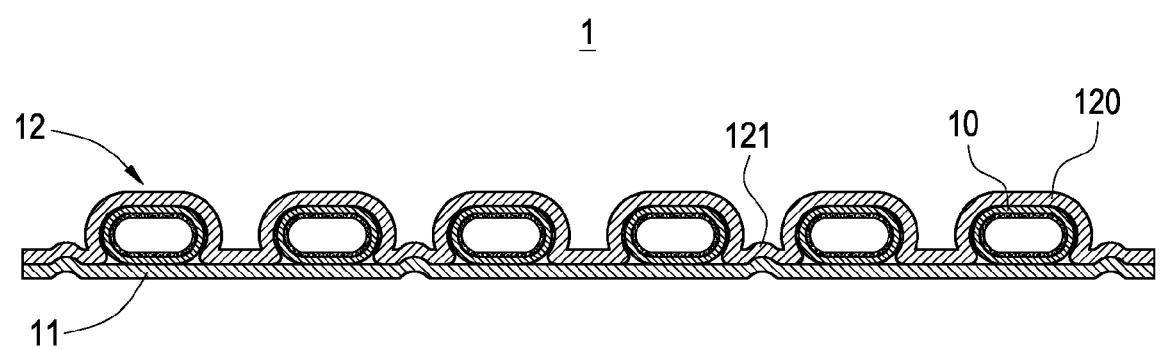
FIG. 5 is a cross-sectional view showing the isothermal plate of another embodiment of the present invention.

Further, as shown in FIG. 4, the inner wall of each shielding cover 120 is provided with at least one fine holes 124 extending along the lengthwise direction of the shielding cover 120. After the heat pipes 10 and the shielding covers 120 are flattened by means of the pressing operation, a slight gap is formed between the heat pipe 10 and both sides of the cambered space 122. At this time, a heat-conducting medium such as heat-conducting paste or soldering material is injected into the fine hole 124, so that the heat-conducting medium can flow into the gap between the heat pipe 10 and the cambered space 122. By passing through a soldering furnace, each heat pipe 10 and the first and second plate bodies 11, 12 can be further bonded and connected with each other. In addition, each locking piece 110 is also bent by the pressing action of the pressing surface 31, so that the first plate body 11 and the second plate body 12 are locked and connected with each other to make the assembly of whole structure more stable. Further, as shown in FIG. 5, the connecting of the first plate body 11 and the second plate body 12 can be made by spot welding or hole drawing on the connecting side-strip 121 of the second plate body 12 and the corresponding position of the first plate body 11, thereby to enhance the bonding effect between the first and second plate bodies 11, 12.

Moreover, before the above pressing operation, a soldering material such as soldering paste can be applied on each heat pipe 10 or the first and second plate bodies 11, 12. In applying the soldering paste, the soldering material has to be heated after the pressing operation, so that the soldering material can be melted to fill the gap, thereby to increase the heat-conducting effect.

Therefore, with the above steps, the method for manufacturing an isothermal plate in accordance with the present invention can be obtained.

According to the above, the present invention indeed achieves the desired effects and solves the drawbacks of prior art. Further, the present invention involves the novelty and inventive steps, and thus conforms to the requirements for an invention patent.

Although the present invention has been described with reference to the foregoing preferred embodiment, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A method for manufacturing an isothermal plate, comprising the steps of:

preparing a plurality of heat pipes, a first plate body and a second plate body;

pressing on the second plate body to form a plurality of shielding covers recessed into the bottom surface of the second plate body and protruding from the top surface of the second plate body, a recessed portion of each shielding cover having a cambered space for horizontally accommodating the heat pipe therein;

disposing each heat pipe into each cambered space to make the first plate body adhered to the bottom surface of the second plate body; and applying an external force to the second plate body to bring each heat pipe into a tight and planar contact with an inner wall of a corresponding cambered space in the direction of the applied external force.

2. The method for manufacturing the isothermal plate according to claim 1, further comprising the step of applying a soldering material on each heat pipe or the first and the second plate bodies so that the soldering material is heated to be melted to fill a gap between the heat pipes and the shielding covers.

3. The method for manufacturing the isothermal plate according to claim 2, wherein the soldering material is a soldering paste.

4. The method for manufacturing the isothermal plate according to claim 1, wherein the first and second plate bodies are made of materials selected from the group consisting of aluminum and copper.

5. The method for manufacturing the isothermal plate according to claim 1, further comprising the step of providing a necessary connection for the first and the second plate bodies to allow the two plate bodies to overlap with each other.

6. The method for manufacturing the isothermal plate according to claim 1, further comprising the step of providing fine holes on the inner wall of each shielding cover, and injecting a heat-conducting medium into the fine holes to flow into a gap between the heat pipes and the shielding covers after the step of applying the external force to the second plate body.

7. The method for manufacturing the isothermal plate according to claim 1, further comprising the step of applying a heat-conducting paste on each heat pipe or the first and the second plate bodies.

* * * * *